United States Patent Office 3,519,484
Patented July 7, 1970

3,519,484
SEPARATOR FOR ALKALINE ELECTRIC CELLS AND METHOD OF MAKING
Helmuth Louis Pfluger and Howard Eugene Hoyt, Huntingdon Valley, Pa., assignors to Borden, Inc., New York, N.Y., a corporation of New Jersey
No Drawing. Filed Nov. 2, 1967, Ser. No. 679,996
Int. Cl. H01m 3/00, 35/00
U.S. Cl. 136—6
11 Claims

ABSTRACT OF THE DISCLOSURE

This invention relates to the battery separator membranes of high electrolytic conductivity comprising a cellulose ether and a compatible water-soluble base and to batteries utilizing said membranes.

Origin of the invention

The invention described herein was made in the performance of work under a NASA contract and is subject to the provisions of Section 305 of the National Aeronautics and Space Act of 1958, Public Law 85–568 (72 Stat. 435; 42 U.S.C. 2457).

Background of the invention

The cycle life of rechargeable battery cells is known to be limited by the tendency of the electrodes to short circuit and this tendency can be slowed down by the use of a separator membrane between the electrodes. In the particular case of alkaline cells such as silver-zinc, silver-cadmium, nickel-cadmium, and the like such a separator must be able to withstand the oxidizing power of silver oxide and the penetration of metallic zinc, nickel, and cadmium, and must also have low resistance to the passage of an electrolytic current. Films of cellulose ethers, and particularly methyl cellulose, have excellent withstanding powers against both silver oxidation and metal penetration. In spite of these advantages, the use of methyl cellulose by itself has not been successful because its resistance to passage of an electrolytic current is prohibitively high in the 30 to 45% alkali metal hydroxide solutions customarily used in battery cells. It is known, as shown in U.S. Pat. No. 2,858,353, that by incorporation within methyl cellulose films of certain polymeric acid materials a certain limited increase in conductivity can be obtained. For optimum performance, however, a greater electrolytic conductivity is required. Moreover, films modified in this manner are not as flexible in the dry state as unmodified methyl cellulose films and require special control of humidity in order to insure freedom from damage during handling.

Summary of the invention

We have now found modified cellulose ether films having an increased electrolytic conductivity and a useable flexibility; and in certain instances an increased flexibility as compared to films of unmodified cellulose ethers.

Our invention comprises battery separator membranes comprising a cellulose ether and a minor proportion of a compatible water soluble base selected from the group consisting of alkali metal and ammonium hydroxides, aliphatic amines, and aliphatic hydroxyamines.

Detailed description of the invention

This invention may be applied to any water-soluble or water-swellable and alkali insoluble cellulose ether, such as methyl cellulose, ethyl cellulose, propyl cellulose, mixtures thereof, and the like.

The preferred ether is methyl cellulose, particularly methyl cellulose in which 1.6 to 1.9 out of every 3.0 available hydroxyl units of cellulose have been etherified. Methods for etherifying cellulose to different degrees and using a variety of ether groups are known to the art and are not a subject of the instant invention.

The base used may be selected from any water-soluble alkali metal hydroxide as well as hydroxides of ammonium and substituted ammonium ions, including quaternary ammonium ions, also water-soluble organic bases including aliphatic primary, secondary and tertiary amines and hydroxyamines. Specific examples of such bases are potassium hydroxide, sodium hydroxide, lithium hydroxide, cesium hydroxide, rubidium hydroxide, ammonium hydroxide, methyl ammonium hydroxide, methyl ethyl ammonium hydroxide, tetramethyl ammonium hydroxide, benzyltrimethyl ammonium hydroxide, triethanolammonium hydroxide, diethylamine, hydroxypropylamine, ethanolamine, diethanolamine, and triethanolamine.

The amount of base may vary from 2 to 20% by weight based on the cellulose ether. Preferred amounts are in the range 5 to 15%, the choice being determined by the degree of resistance lowering desired (electrolytic conductivity increase desired) and by the necessity of avoiding frosting out of the base from the film which occurs at varying threshold levels depending on the base used.

In addition to the methyl cellulose, the polymeric composition of the film may also include minor amounts of more polar polymeric materials such as polyacrylic acid or the 1:1 copolymer of vinyl methyl ether and maleic anhydride. The polar polymeric substance may vary in concentration up to 40% by weight, but it is generally preferred not to exceed 33% because of the stiffening and non-flexibilizing effects which such components impart.

The membrane may be prepared by combining aqueous solutions respectively of methyl cellulose and of the other additives. The resulting composition may be cast in sheet form and evaporated to dryness. Other forms may be made as for example plates, slabs, "buttons," films and the like. Solutions of the components should not be so concentrated as to precipitate the components before drying.

Good flexibility in the film is of particular importance in the construction of the individual battery cells during the operation of wrapping the separators around the electrodes. In one common technique a so-called U wrap is made whereby two positive electrodes are placed butt end to butt end on a sheet of separator and after, for example, six wraps of the pair the wrapped assembly is folded at the junction in the form of the letter U. When separators of poorer flexibility are used cracks tend to occur in the separator at the base of the U, particularly in the outer wraps, thus destroying the utility of the separator at these points. We have found experimentally that this is particularly likely to occur below a certain critical threshold of flexibility, corresponding to withstanding at least about 800 flex cycles as measured by the ASTM Folding Endurance Test D643–43 with 200 grams tension on the specimen.

The invention will be further illustrated by description in connection with the following specific examples of the practice of it, the proportions here and elsewhere herein being expressed as parts by weight except where indicated specifically to the contrary.

EXAMPLE 1

30 grams of 5% potassium hydroxide solution in water was heated to 80° C. Ten (10) grams of methyl cellulose (Methocel 15) was added and stirred at the same temperature for five minutes. Sixty grams of ice was then stirred into the mixture. After standing in the cold for release of bubbles the solution was cast, using a doctor blade at 22 mil clearance. The dried film was much improved in clarity. Unexpectedly the electrolytic resistance of the film in 45% potassium hydroxide was lowered to 31 milliohms-in.$^2$ compared to 7250 milliohm-in.$^2$ for a corresponding methyl cellulose film.

EXAMPLE 2

A solution was prepared of 480 grams of methyl cellulose (Methocel 15) in 4320 grams of water. To this solution was added, with stirring, 480 grams of a 10% aqueous solution of tetramethyl ammonium hydroxide. The resulting clear homogeneous solution was cast on a level glass plate, using a doctor blade set at 21 mils clearance. Evaporation to dryness resulted in a flexible film of 1.5 mils thickness. The properties of this film were compared against those of a corresponding unmodified methyl cellulose film with the following results:

|  | The film of this example | Unmodified methyl cellulose film |
|---|---|---|
| Thickness, mils | 1.4 | 1.5 |
| Resistance, milliohms-in.$^2$: |  |  |
| Equilibrated with 30% KOH | 22.8 | 712 |
| Equilibrated with 45% KOH | 56.8 | 7,250 |
| MIT Flex Test, cycles (using ASTM Folding Endurance Test D 643-43 with 200 grams tension on film, at 50% relative humidity and 71° F.) | 6,992 | 3,937 |
| Tensile strength, p.s.i | 7,490 | 7,190 |

Thus the modified film had the double advantage of both low electrolytic resistance and improved dry flexibility.

EXAMPLE 3

By the procedure of Example 1, 3 parts sodium hydroxide per 100 parts methyl cellulose were incorporated into a film of 1.4 mils thickness. Resistance after equilibration with 45% potassium hydroxide solution was 1655 milliohms-in.$^2$, MIT flex of the dry film was 2858 cycles and tensile strength was 11,100 p.s.i.

EXAMPLE 4

By the procedure of Example 1, 6 parts sodium hydroxide per 100 parts of methyl cellulose were incorporated into a film of 1.6 mils thickness. Resistance after equilibration with 45% potassium hydroxide solution was 330 milliohms-in.$^2$, MIT flex of the dry film was 2233 cycles and tensile strength was 8500 p.s.i.

EXAMPLE 5

By the procedure of Example 1, fourteen parts of 3-hydroxypropylamine per 100 parts of methyl cellulose were incorporated into a film of 1.7 mils thickness. Resistance after equilibration with 45% potassium hydroxide was 573 milliohms-in.$^2$, MIT flex was 3216 cycles and tensile strength was 8140 p.s.i.

EXAMPLE 6

By the procedure of Example 1, six parts of potassium hydroxide per 100 parts of methyl cellulose were incorporated into a film of 1.4 mils thickness. Resistance after equilibration with 45% potassium hydroxide was 330 milliohms-in.$^2$. After equilibration with 30% potassium hydroxide another specimen of this film had a resistance of only 60 milliohms-in.$^2$. MIT flex of the dry film was 3100 cycles and tensile strength was 8870 p.s.i.

EXAMPLE 7

By the procedure of Example 1, nine parts of potassium hydroxide per 100 parts of methyl cellulose were incorporated into a film of 1.5 mils thickness. Resistance after equilibration with 45% potassium hydroxide was 244 milliohms.-in.$^2$. After equilibration with 30% potassium hydroxide another specimen of this film had a resistance of only 42 milliohms-in.$^2$. MIT flex of the dry film was 2272 cycles and tensile strength was 7350 p.s.i.

EXAMPLE 8

By the procedure of Example 1, 67 parts methyl cellulose, 33 parts polyacrylic acid (Acrysol A5) and 14.4 parts 3-hydroxypropylamine were incorporated into a film of 1.6 mils thickness. Resistance after equilibration with 45% potassium hydroxide was only 14 milliohms-in.$^2$ and MIT flex was 4958 cycles.

EXAMPLE 9

By the procedure of Example 1, 80 parts methyl cellulose, 20 parts polyacrylic acid and 10 parts triethanolamine were incorporated into a film of 1.3 mils thickness. Resistance after equilibration with 45% potassium hydroxide was only 245 milliohms-in.$^2$ and MIT flex was 9850 cycles. Tensile strength was 7000 p.s.i.

EXAMPLE 10

By the procedure of Example 1, 80 parts methyl cellulose, 20 parts polyacrylic acid and 20 parts triethanolamine were incorporated into a film of 1.4 mils thickness. Resistance after equilibration with 45% potassium hydroxide was only 60 milliohms-in.$^2$ and MIT flex was 21,000 cycles. Tensile strength was 5,220 p.s.i.

EXAMPLE 11

By the procedure of Example 1, 80 parts methyl cellulose, 30 parts of the 1:1 copolymer of vinyl methyl ether, maleic anhydride (Gantrez AN) and 20 parts triethanolamine were incorporated into a film of 1.4 mils thickness. Resistance after equilibration with 45% potassium hydroxide was only 29 milliohms-in.$^2$ and MIT flex was 15,850 cycles. Tensile strength was 4870 p.s.i.

EXAMPLE 12

Representative films of this invention were stirred for 72 hours in 30% potassium hydroxide saturated with silver oxide, conditions which oxidize and degrade PUDO cellophane customarily used in alkaline battery cells so drastically that the cellophane no longer has any breaking strength. Corresponding samples of the same films of this invention were also stirred for 72 hours in 30% potassium hydroxide in the absence of silver oxide. Both sets of film were broken in a tensile testing machine. The difference in strength between the samples exposed to silver oxide and the sample not so exposed was found to be statistically insignificant. Thus, for example, the film of Example 7 had breaking strength 4660 p.s.i., after swelling in 30% potassium hydroxide and 4600 p.s.i. after the exposure to silver oxide. The film of Example 10 had breaking strength 1990 p.s.i. after swelling in 30% potassium hydroxide and 2100 p.s.i. after the exposure to silver oxide.

Thus, the films of this invention are superior to the customarily used cellophane in withstanding the oxidation power of silver oxide which is a normal constituent of the electrolyte in silver-zinc and silver-cadmium cells.

It will be understood that it is intended to cover all changes and modifications of the examples of the invention herein chosen for the purpose of illustration which do not constitute departures from the spirit and scope of the invention.

What is claimed is:
1. A substantially dry battery separator membrane for alkaline electrochemical cells prepared by
   (a) making an aqueous solution comprising a cellulose ether and a compatible water-soluble base selected from the group consisting of alkali metal hydroxides, ammonium hydroxides, aliphatic amines and aliphatic hydroxyamines, said base being in the proportion of from about 2 to about 20 parts by weight for each 100 parts of cellulose ether.
   (b) casting said solution in sheet form, and
   (c) evaporating said sheet to dryness.
2. The membrane of claim 1 wherein the cellulose ether is methyl cellulose.

3. The membrane of claim 1 wherein the cellulose ether is methyl cellulose with degree of substitution in the range 1.6–1.9 out of every 3.0 available hydroxyl units.

4. An alkaline electrochemical cell comprising electrodes, a concentrated aqueous alkali fluid, and the battery separator of claim 1 interposed between the electrodes.

5. An alkaline silver cell comprising electrodes, a concentrated aqueous alkaline fluid, and the battery separator of claim 2 interposed between the electrodes.

6. An alkali silver-zinc cell comprising a silver electrode, a zinc electrode, a concentrated aqueous alkali fluid, and the battery separator of claim 3 interposed between the electrodes.

7. A substantially dry membrane capable of developing high electrolytic conductance after equilibration with concentrated aqueous alkali, said membrane being prepared by
(a) making a solution comprising methyl cellulose with a degree of substitution in the range of about 1.6–1.9 and a base selected from the group consisting of potassium hydroxide, tetramethylammonium hydroxide, sodium hydroxide, 3-hydroxypropylamine and triethanolamine, said base being in a proportion of from about 5% to about 15% by weight of the methyl cellulose,
(b) casting said solution in sheet form, and
(c) evaporating said sheet to dryness.

8. An alkaline silver-zinc cell comprising a silver electrode, a zinc electrode, a concentrated aqueous alkali fluid and as a battery separator interposed between the electrodes, a membrane prepared by
(a) making an aqueous solution comprising methyl cellulose with a degree of substitution in the range of about 1.6–1.9 and a compatible water-soluble base, in the proportion of from about 5 to about 15 parts by weight for each 100 parts methyl cellulose, said base being selected from the group consisting of alkali metal hydroxides, ammonium hydroxides, aliphatic amines and aliphatic hydroxyamines,
(b) casting said solution in sheet form, and
(c) evaporating said sheet to dryness.

9. A method for making a dry membrane capable of developing high electrolytic conductance after equilibration with concentrated aqueous alkali, which method comprises
(a) making an aqueous solution comprising a cellulose ether and a compatible water-soluble base in the proportion of from about 2 to about 20 parts by weight for each 100 parts of cellulose ether, said base being selected from the group consisting of alkali metal hydroxides, ammonium hydroxides, aliphatic amines and aliphatic hydroxyamines,
(b) casting said solution in sheet form, and
(c) evaporating said sheet to dryness.

10. A method for making a dry membrane capable of developing a high electrolytic conductance after equilibration with concentrated aqueous alkali, which method comprises
(a) making an aqueous solution comprising methyl cellulose with a degree of substitution in the range of about 1.6–1.9 and a base in the proportion of from about 5 to about 15 parts by weight for each 100 parts of methyl cellulose, said base being selected from the group consisting of potassium hydroxide, tetramethylammonium hydroxide, sodium hydroxide, 3-hydroxypropylamine and triethanolamine,
(b) casting said solution in sheet form, and
(c) evaporating said sheet to dryness.

11. A method for making a silver-zinc cell which comprises interposing between silver and zinc electrodes a substantially dry battery separator membrane prepared by making an aqueous solution comprising methyl cellulose with a degree of substitution in the range of about 1.6–1.9 and a compatible water-soluble base in the proportion of from about 5 to about 15 parts by weight for each 100 parts methyl cellulose, said base being selected from the group consisting of alkali metal hydroxides, ammonium hydroxides, aliphatic amines and aliphatic hydroxyamines, casting said solution in sheet form, and evaporating said sheet to dryness, placing the assembly of said electrodes and membrane in a cell vessel and adding thereto a concentrated aqueous alkali fluid.

References Cited

UNITED STATES PATENTS

| | | | |
|---|---|---|---|
| 2,438,975 | 4/1948 | Jones | 106—186 |
| 2,696,515 | 12/1954 | Koren et al. | 136—146 |
| 2,771,377 | 11/1956 | Greminger | 106—186 |
| 2,858,353 | 10/1958 | Mendelsohn | 136—146 |
| 2,900,433 | 8/1959 | Cahoon et al. | 136—146 |

WINSTON A. DOUGLAS, Examiner

D. L. WALTON, Assistant Examiner

U.S. Cl. X.R.

106—186; 136—146, 148; 260—232